Nov. 17, 1959   L. AZARRAGA   2,912,897
PANORAMA MOVING PICTURE CAMERA
Filed July 31, 1958   3 Sheets-Sheet 2
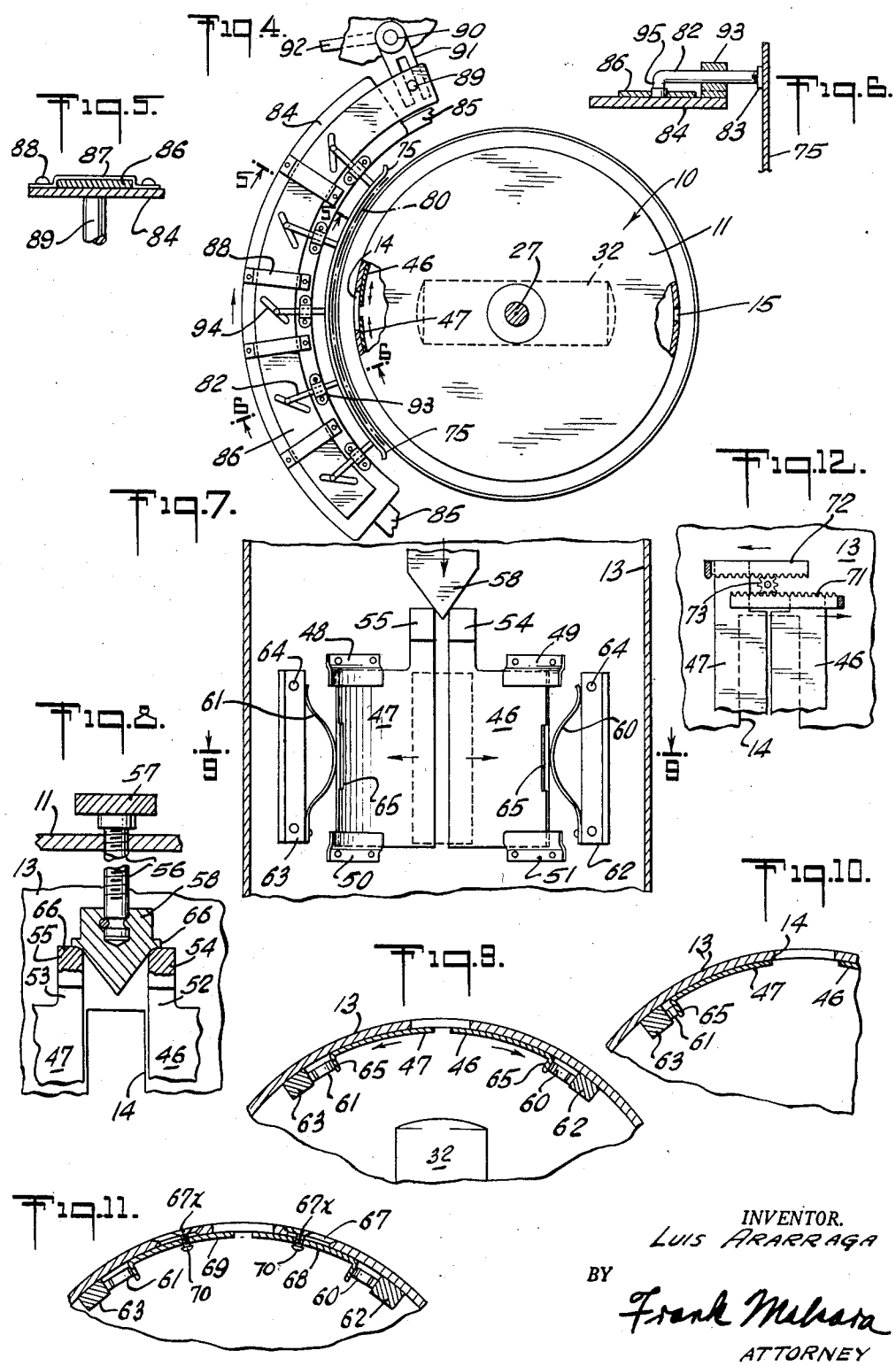
INVENTOR.
LUIS AZARRAGA
BY
Frank Mahara
ATTORNEY Nov. 17, 1959     L. AZARRAGA     2,912,897
PANORAMA MOVING PICTURE CAMERA
Filed July 31, 1958     3 Sheets-Sheet 3
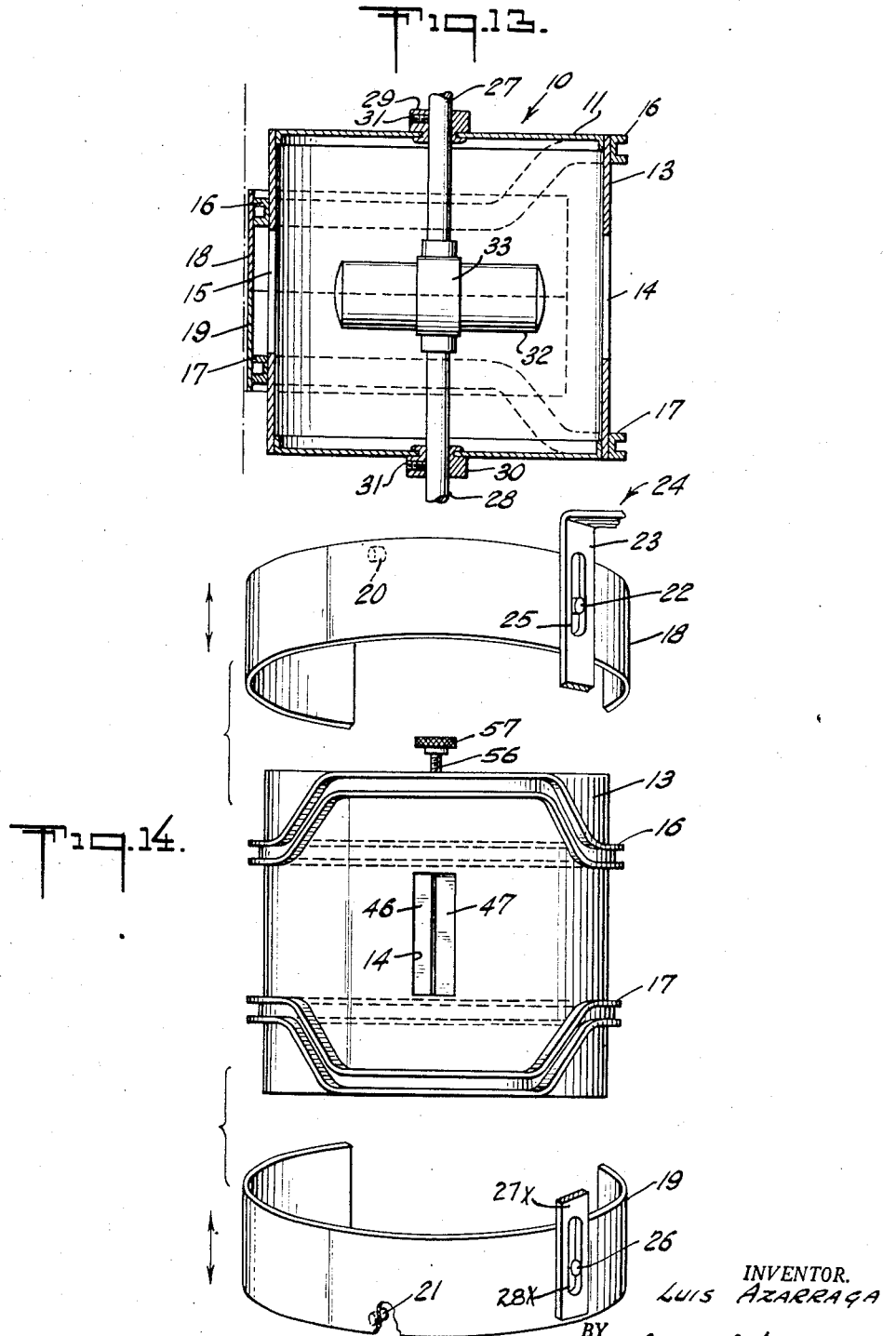
INVENTOR.
LUIS AZARRAGA
BY
Frank Mahara
ATTORNEY

United States Patent Office 2,912,897
Patented Nov. 17, 1959

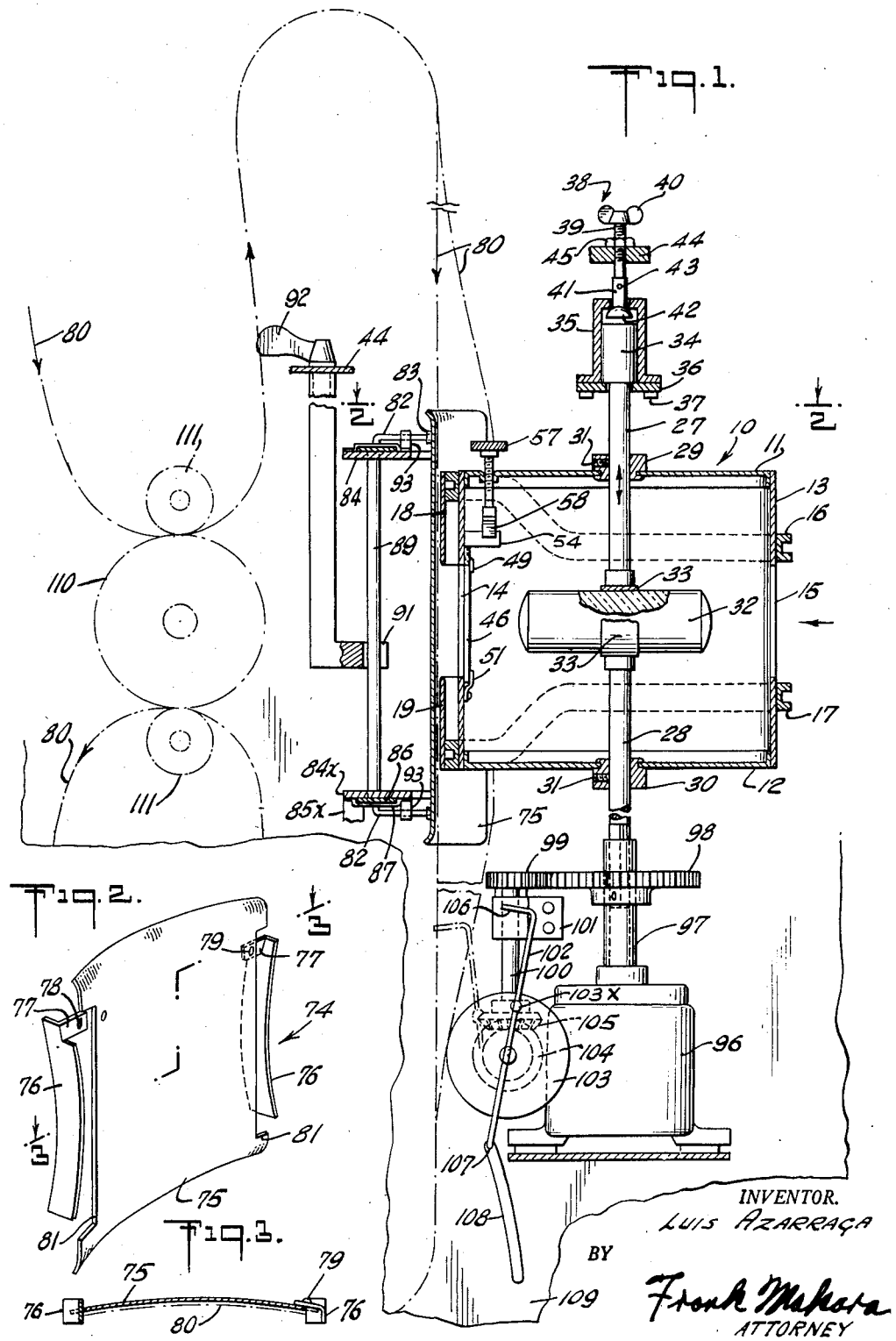

2,912,897
PANORAMA MOVING PICTURE CAMERA
Luis Azarraga, Mineola, N.Y.

Application July 31, 1958, Serial No. 753,392

6 Claims. (Cl. 88—16)

This invention relates to a movie camera and more particularly to a movie camera having a rotating lens adapted for taking panorama views and scenes.

It is an object of this invention to provide a movie camera having a rotating lens.

It is another object to provide a movie camera adapted to present a curved film to the scene being impinged upon said film.

It is a further object to provide a panorama movie camera capable of taking panorama scenes in natural appearance and with the distortion common to conventional flat film movie cameras.

These and other objects of this invention will become apparent upon reading the following descriptive disclosure of an illustrative embodiment of this invention as shown in the accompanying drawing in which:

Fig. 1 is a schematic view partly in section showing the working mechanism of this invention, Fig. 2 is a perspective view of the film holder for holding the film in a curved configuration, Fig. 3 is a sectional view taken on line 3—3 of Fig. 2, Fig. 4 is a top plan view partly in section showing the manner of moving the film to effect correct focus, Fig. 5 is a view taken on line 5—5 of Fig. 4, Fig. 6 is a view taken on line 6—6 of Fig. 4, Fig. 7 is a view of the shutter disposed in the revolving drum showing one manner of selectively opening the opposing gates and showing the drum wall in breakway and in section, Fig. 8 is a detailed section view showing the wedge manner of opening the opposing gates to full open position, Fig. 9 is a view taken on line 9—9 of Fig. 7, Fig. 10 is a transverse view showing of the gates of Fig. 8 in full open position, Fig. 11 is a transverse view of another manner of opening the gates and securing the opened gates to the drum wall, Fig. 12 is a front view of the racket and pinion used to open uniformly the opposed gates of the modification of Fig. 11, Fig. 13 is a vertical section through the revolving drum and showing the co-acting opposed curved shutters captively held in their respective rails disposed on the drum interior surface, and Fig. 14 is an exploded view showing the opposing shutters free of their holding rails.

Turning to Fig. 1 this invention comprises a revolving enclosed cylindrical drum 10 having a top wall 11 and a bottom wall 12. The drum 10 has a continuous wall 13, provided with two suitable diametrically opposed vertical slots 14 and 15 (Figs. 1 and 4). The slots 14 and 15 are of equal width and vertical gate means, to be described hereinafter, are provided over slot 14 to in effect adjust the width of this slot.

The exterior surface of drum 13 is provided with a pair of suitable U-shaped rails namely a top rail 16 and a bottom rail 17 of suitable co-acting configuration (Fig. 14). These rails are of annular continuous construction.

A pair of curved vertically disposed shutters, namely a top shutter 18 and a bottom shutter 19 are disposed respectively and exteriorly of said rails 16 and 17. The shutters 18 and 19 are preferably curved about 270° so that they are retainingly clasped about their respective rails.

Shutters 18 and 19 are respectively provided with a suitable cylindrical pin 20 and 21 preferably conventional roller pins, which fit in rails 16 and 17. Pins 20 and 21 effect and restrain the upward and downward movement of shutters 18 and 19 respectively.

Since rails 16 and 17 have inclined areas of configuration which diverge and converge in opposed relationship, it follows that shutters 18 and 19 simultaneously move away from each other or towards each other as the roller pins 20 ride a respective pair of divergent rail sections of rails 16 and 17 or a respective pair of convergent rail sections of rails 16 and 17.

Shutter 18 is provided with a stud 22 on its exterior surface. A depending leg 23 with a bracket 24 secured to the camera case (not shown) is provided with a slot 25. Stud 22 is disposed in slot 25 thereby preventing rotational movement of shutter 16.

Similarly bottom shutter 19 is provided with a stud 26 disposed in a bracket 27X slot 28X said brackets being secured to the camera case (not shown).

A top rod 27 and a bottom rod 28 are disposed respectively in the center of drum top wall 11 and drum bottom wall 12. The top rod 27 passes through an apertured bushing 29 fixed in light tight manner to drum wall 11. The bottom rod 28 passes through an apertured bushing 30 fixed in light tight manner to drum wall 12. The bushings 29 and 30 are each fixedly secured respectively to rods 27 and 28 by set screws 31 thereby causing the rods 27 and 28 and drum 13 to rotate as a unit without slippage.

Rods 27 and 28 are spaced-apart centrally within the drum 10 and a suitable barrel lens 32 is disposed therebetween in a suitable holding saddle 33 secured to the free ends of rods 27 and 28.

Lens 32 may be raised or lowered by first loosening the set screws of bushings 29 and 30 and then raising or lowering rods 27 and 28 as a unit along with saddle 33 and captively held lens 32.

To effect minute raising and lowering of the lens 32, the top of rod 27 is provided with an integral cylinder 34 of enlarged diameter. A cup shaped holder 35 having an apertured bottom wall is provided and inverted so that cylinder 34 fits within the cup cavity of holder 35. A bottom apertured plate 36 is secured to the holder 35 about the cup cavity by means of conventional metal threaded bolts 37. Thus raising of holder 35 raises the rod 27 and the lens 32 secured thereto.

To effect raising of cup holder 35 a wing nut elevating screw 38 is provided. The screw 38 is provided with a threaded shank 39, wing plate 40 and a swivel pin 41 having an enlarged head 42 disposed below the aperture of the bottom cup wall. In short, the cup holder 35 is held up by swivel pin head 42. Swivel pin 41 is secured to screw 38 by a horizontally disposed holding pin 43.

Threaded shank 39 of screw 38 passes through a suitable opening in the camera casing 44. The camera casing 44 may be rectangular, round or of other configuration and functions to hold the working parts of this invention. A lock screw 45 is disposed about shank 39 so that after the lens 32 has been adjusted in height it is locked by screw 45 and screws 31 from subsequent displacement.

To effect suitable opening of slot 14 for various light intensity conditions a gate is provided on the interior surface of drum wall 13 about the slot. This gate preferably comprises two gate sections which move equally and simultaneously away from and toward the slot center. The gate in effect produces a selective slot opening over slot 14.

One modification of opening or closing selectively the gate sections 46 and 47 is shown in Figs. 1, 7 and 8. In this modification the curved gate sections 47 and 46, having a radius substantially that of drum 13, are held in opposed sliding relationship by top brackets 48 and 49 and bottom brackets 50 and 51 respectively which brackets are secured to drum wall 13 by conventional spot welding or rivets. Brackets 48, 49, 50 and 51 are provided with offset sections so that gates 46 and 47 may be captively and slidably held thereby.

Gates 46 and 47 are each provided with upright sections 52 and 53 having metal blocks 54 and 55 secured to them respectively as by welding (Fig. 8). An adjustment mechanism having a threaded shank 56 is threadingly passed through drum top wall 11 in light tight manner. The shank 56 is provided with a fixed finger plate 57 at its top exterior of wall 11 and with a wedge 58 interiorly of wall 11.

The wedge 58 is provided with a top cavity in which the bottom and unthreaded portion of shank 56 fits. To effect rotation of shank 56 in wedge 58 while captively held therein, the shank 56 is provided with a conventional semi-circular channel and the wedge with a suitable pin hole in which a pin 59 is disposed. Thus turning of plate 57 turns shank 56 and raises wedge 58.

As shown in Fig. 7, the gates 46 and 47 are continuously urged inwardly by suitable bow springs 60 and 61 respectively. The bow springs 60 and 61 are secured to holders 62 and 63 respectively which holders 62 and 63 are secured to the inner surface of wall 13 as by conventional rivets 64.

Movement of wedge 58 downwardly (Fig. 7) causes blocks 54 and 55 and thus gates 46 and 47 to move outwardly against springs 60 and 61, thereby opening or widening the slot between gates 46 and 47. Movement of wedge 58 upwardly causes gates 46 and 47 to move toward one another to close the slot there between.

The gates 46 and 47 are each provided with an integral segment 65 against which bow springs 60 and 61 rest respectively. Wedge 58 is provided with limit stop lugs 66 which engage blocks 54 and 55 when the slot between gates 46 and 47 has reached a maximum opening equal to that of slot 14.

Another manner of opening gates 46 and 47 in lieu of use of a wedge 58 is to provide the drum with a suitable horizontal slot 67 on each side of slot 14 and secure a suitable screw 67X into the respective gate 68 and 69 (Fig. 11). The slots 67 have horizontal beveled walls, the bevels of which mate with the underside of the screw heads of screws 67X. The apertures in plates 68 and 69 through which threaded screws 67X pass are threaded and the screws 67X after being threaded into these gate apertures are peened to make a bulb 70 thereon, thereby captively holding screws 67X to their respective gate and in their respective slot.

In opening the gates of the modification shown in Fig. 11 the gates are pushed apart by hand or a screw driver to the desired opening and then the screws 67X are tightened by threading inwardly into their respective gate until the underside of the screw heads engage the beveled edge of slot 67 in a rigid and non-moveable manner.

In order to effectuate equal opening of the gate of the modification of Fig. 11 a rachet and pinion device is employed (Fig. 12). To this effect a rachet bar 71 with upright teeth is fixed to the top of gate 46 while a rachet bar 72 with depending teeth is fixed to the top of gate 47. A suitable gear or pinion 73 is secured in wall 13 above the middle of slot 14 and the teeth of ratchet bars 71 and 72 are suitably meshed into gear 73 thereby causing equal movement of a gate from the center of slot 14 upon the corresponding movement of the opposing gate. Both of the rachet bars 71 and 72 are fixed to their respective gates by welding or other conventional means.

Turning now to Figs. 1, 2 and 3, there is shown a vertical film holder 74 (Fig. 2) comprising a suitably curved back plate 75 to the vertical edges of which a pair of bow springs 76 are attached. The bow springs are each provided with at least one attachment flange 77 integral with the bow spring 76 and disposed in the direction of the bow thereof and at a right angle thereto. Each of the flanges 77 is provided with an aperture 78 and they are secured to the back plate 75 by means of a rivet 79. In lieu of use of rivets the flanges 77 may be spot welded to the back plate 75. For purposes of simplicity the left bow spring 76 (Fig. 2) is shown unattached to back plate 75.

While a single top flange 77 on each bow spring 76 is sufficient to hold the film 80 (shown in dotted outline in Fig. 3) therebetween in curved relationship against the back plate 75, a similar bottom flange (not shown) may be secured to the bottom of each bow spring 76 and also to a back plate 75. The back plate 75 is preferably provided with cut-out channels 81 to accommodate bow springs 76, but back plates having no cut-out channels therein are operable.

As shown in Fig. 1 the back plate 75 is disposed behind the lens 32 and the gates 46 and 47, when the shutters 18 and 19 are open position. The film 80 (Fig. 1) is shown in curved position against back plate 75, without bow springs the film 80 is non-curved or flat.

Turning to Figs. 1, 4, 5 and 6, there is shown the manner of focusing the film 80 relative to lens 32 by moving the film 80 in its back plate 75 toward or away from the lens 32. Back plate 75 is secured to a plurality of the threaded slide rods 82, threaded into threaded lugs 83 secured as by welding to back plate 75 (Fig. 6).

A horizontally disposed top curved support plate 84 is disposed behind and adjacent the top of vertical back plate 75 and fixedly secured to the casing 44 by means of a pair of spaced-apart integral rigid brackets 85. A horizontally disposed bottom curved plate 84X (Fig. 1), identical to plate 84, is disposed directly therebeneath and fixedly secured to casing 44 by means of integral rigid brackets 85X.

A curved slide bar 86 is disposed on each of the plates 84 and 84X and confined respectively thereby by a plurality of U-shaped straps 87 spanning said bars 86 and secured to the respective plates 84 and 84X by rivets 88.

The top slide bar 86 and the bottom slide bar 86 are secured together at one end by connecting cylindrical bar 89 at a point beyond the supporting plates 84 and 84X since the slide bars 86 extend beyond said plates 84 and 84X at this end (Fig. 4). Thus pulling or pushing said bars respectively is done as a unit.

To effect such a pulling or pushing of the connecting bar 89 from outside the camera casing 44 a rotatable pillar 90 having a horizontally disposed fork 91 is fixedly secured to the casing 44 in suitable spaced relationship to bar 89. The bar 89 is disposed between the tines of the fork 91 so that partial rotation of pillar 90 with its fixed fork 91 causes the bar 89 to pull or push both slide bars simultaneously.

To effect such partial rotation of pillar 90, from outside the camera casing 44 said pillar is extended through the casing 44 (Fig. 1) and a thumb latch 92 fixedly secured to its end, latch 92 being limited in its partial rotation by conventional stops (not shown).

As shown in Fig. 4, the slide rods 82 are each slidably secured to the stationary plates 84 and 84X by means of conventional hump brackets 93 secured by conventional rivets to the plates 84 and 84X. The slide bars 86 are also provided with a plurality of suitable angularly disposed slots 94 with a slot 94 provided for each slide rod 82. The slide rods 82 are each provided with a depending finger 95 the bottom portion of which is disposed in a respective slot 94. Clearly movement of connecting bar 89 to the right (Fig. 1) and thus of slide bars 86 to the right causes the fingers 95 to ride against the slot 94 walls thereby pulling slide bars 82 outwardly thus causing the back plate 75 with its confined film 80 thereon to move outwardly away from lens 32. There is thus provided a means of radially focusing the film. Such focusing is done not by moving the lens as in conventional practice but by moving the film 80.

Referring to Fig. 1, the rotating lens 32 may be motivated by any constant conventional means such as an electrical motor 96 or a coil spring secured to the casing 44.

The shaft 97 of motor 96 is fixedly coupled to shaft 28 being provided with a conventional square cavity in which the square end of shaft 28 fits.

In order to provide synchronization of the downward movement of the conventional edge perforated movie film 80 with the rotation of lens 32 and drum 13 and shutter movement of shutters 18 and 19, a suitable gear 98 is fixedly secured to shaft 97 by a conventional set screw. A mating gear 99 mates with gear 98, said gear 99 being fixedly secured to a vertically disposed rotatable shaft 100, said shaft 100 being held in place by bracket 101 secured to the camera casing 44.

A conventional claw mechanism is used to advance the film one frame for each opening of the shutters 18 and 19 and thus for each rotation of the lens 32 and drum 13 within the enveloping camera casing 44.

The claw 102 is secured to a rotatable disc 103 at a point 103X which is eccentric or off center from the center of disc 103. To effect rotation of disc 103 a horizontally disposed bevel gear 104 is secured thereto and mated with a vertically disposed bevel gear 105 secured fixedly to shaft 100. The claw 102 is provided with a suitable prong 106 at its top for entering the perforations disposed on the edge of film 80 and with a conventional angularly disposed stud 107 at its base, said stud being disposed in slot 108 in a vertical plate member 109 secured to casing 44.

The film 80 is fed in suitable loop relationship to the back plate 75 by means of a conventional idler sprocket wheel 110 supported by a pair of retaining wheels 111.

In the operation of this invention, the gates 46 and 47 are adjusted and the camera then aimed in the direction of the scene. The starting of motor 96 causes the drum and lens to rotate, causing the lens to sweep horizontally across a stationary film frame giving a panaroma effect on the film.

This invention has been described by means of an illustrative embodiment of the invention but it is not to be limited thereto except by the appended claims.

I claim:

1. A moving picture camera for taking panorama scenes, comprising a casing, a rotatable dual linear apertured cylindrical drum mounted within said casing, means for rotating said drum continuously, an optical lens mounted centrally within said drum and in linear relationship to the apertures thereof, support means secured to the end walls of said drum for mounting said lens centrally therein, means connected to said support means and to said casing for elevating and lowering said support means, a pair of shutters mounted on said drum for synchronously opening and closing one of the apertures of said drum, gate means mounted adjustably about an aperture of said drum, rail means mounted on said drum for synchronously simultaneously opening and closing said shutters, a curved back plate mounted within said casing and disposed adjacent said drum, means secured to said back plate for holding a continuous film thereagainst, means secured to said casing for moving said back plate toward and away from said drum to effect radial focusing of the film thereon by said lens, and claw means connected to said means for rotating said drum for advancing said continuous film one frame for each revolution of said drum.

2. The camera of claim 1 wherein the gate means mounted about one of said drum apertures comprises a pair of curved gates adapted for movement in opposed relationship, means for holding said gates to the inner wall of said drum in slideable manner, spring means disposed against each of said gates for continuously urging the gates together and manually operated wedge means disposed between and against each of said gates and to said drum for selective opening of the aperture between said gates.

3. The camera of claim 2 wherein the rail means are a pair of continuous spaced-apart channel rails diverging from one another over the drum aperture having said gates.

4. The camera of claim 3 wherein the means secured to the back plate for holding the continuous film thereagainst is a pair of bow springs each secured to an opposed vertical edge of said back plate in space relation thereto whereby a film strip disposed curvedly between said springs is held therebetween in a slidable manner.

5. The camera of claim 4 wherein said means to effect radial focusing comprises a pair of spaced-apart support plates disposed behind said back plate and secured to the interior of the camera casing, a slidable curved bar disposed on each support plate each having a plurality of suitably angled slots therein, a plurality of brackets secured to said support plates and over said curved slide bars to hold them in place, a connecting bar secured to one end of said slide bars, manual means connected to said connection bar and extending through the camera casing to move said connecting bar to and fro through a suitable angle, a plurality of slide rods secured to said back plate each having a depending leg disposed in a co-acting angled slot of said slide bar, and a plurality of bracket means each disposed over a slide rod and secured to a support plate whereby movement of said manual lever means moves said slide bars and thus said slide rods and thus said back plate with its film toward and away from said lens.

6. The camera of claim 5 wherein each of said pair of shutters comprises a partial cylinder, a pin secured to each shutter and disposed in a respective channel rail, and means secured to each of said shutters and to the casing preventing horizontal rotation of said shutters while permitting vertical reciprocal movement thereof.

References Cited in the file of this patent

UNITED STATES PATENTS

| 779,956 | Mills | Jan. 10, 1905 |
| 1,693,722 | McInnis | Dec. 4, 1928 |
| 1,837,467 | McInnis | Dec. 22, 1931 |
| 1,943,378 | Elms | Jan. 16, 1934 |

FOREIGN PATENTS

| 21,154 | Great Britain | of 1890 |
| 672,795 | Great Britain | May 28, 1952 |